United States Patent
Takada

(10) Patent No.: US 9,588,896 B2
(45) Date of Patent: Mar. 7, 2017

(54) COMPUTER AND MEMORY CONTROL METHOD

(71) Applicant: Hitachi, Ltd., Tokyo (JE)

(72) Inventor: Aritoki Takada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 95 days.

(21) Appl. No.: 14/423,613

(22) PCT Filed: Mar. 4, 2014

(86) PCT No.: PCT/JP2014/055444
§ 371 (c)(1),
(2) Date: Feb. 24, 2015

(87) PCT Pub. No.: WO2015/132877
PCT Pub. Date: Sep. 11, 2015

(65) Prior Publication Data
US 2016/0253263 A1    Sep. 1, 2016

(51) Int. Cl.
*G06F 12/00*    (2006.01)
*G06F 12/08*    (2016.01)

(52) U.S. Cl.
CPC ...... *G06F 12/0842* (2013.01); *G06F 12/0871* (2013.01); *G06F 12/0893* (2013.01); *G06F 2212/1016* (2013.01); *G06F 2212/1048* (2013.01); *G06F 2212/601* (2013.01); *G06F 2212/6042* (2013.01)

(58) Field of Classification Search
CPC ............. G06F 12/0842; G06F 12/0871; G06F 12/0893
See application file for complete search history.

(56) References Cited

U.S. PATENT DOCUMENTS

| 5,420,998 A | 5/1995 | Horning |
| 6,078,992 A * | 6/2000 | Hum .................. G06F 12/0897 711/120 |
| 2012/0198159 A1 | 8/2012 | Fujikawa et al. |

FOREIGN PATENT DOCUMENTS

| JP | 03-063741 A | 3/1991 |
| JP | 10-154101 A | 6/1998 |
| WO | 2011/045931 A | 4/2011 |

* cited by examiner

*Primary Examiner* — Gurtej Bansal
(74) *Attorney, Agent, or Firm* — Volpe and Koenig, P.C.

(57) ABSTRACT

A computer includes a first memory, a second memory having an I/O speed lower than an I/O speed of the first memory, a storage device, and a processor. The first memory has a work area and a first cache area where data input to and output from the storage device is temporarily stored and the second memory has a second cache area where the data input to and output from the storage device is temporarily stored and a swap area to be a saving destination of data stored in the work area. The processor reduces the work area and expands the first cache area, when an input/output amount to be an amount of data input to and output from the storage device is larger than a predetermined input/output amount.

8 Claims, 13 Drawing Sheets

Fig. 4

| Policy information | |
|---|---|
| I/O reference amount of HDD | 1000MB/s |
| Swap frequency reference amount | 100times/s |
| Swap securement reference value | 70% |
| Swap use upper limit | 80% |
| Swap use lower limit | 50% |

Fig. 5

| Operation information | |
|---|---|
| Work area amount | 5834MB |
| Swap area amount | 20480MB |
| Swap use amount | 15219MB |
| Swap frequency | 20times/s |
| Second cache read hit amount | 450MB/s |
| Second cache read error amount | 150MB/s |
| Second cache write hit amount | 40MB/s |
| Second cache write error amount | 10MB/s |

Fig. 11

| Operation information | | | |
|---|---|---|---|
| VM (A) | Virtual memory use amount | 891MB | 161 |
| | Swap area amount | 4096MB | 162 |
| | Swap use amount | 2155MB | 163 |
| | Swap frequency | 15times/s | 164 |
| VM (B) | Virtual memory use amount | 891MB | 161 |
| | Swap area amount | 4096MB | 162 |
| | Swap use amount | 2155MB | 163 |
| | Swap frequency | 15times/s | 164 |
| ... | | | 155 |
| Second cache read hit amount | | 450MB/s | 156 |
| Second cache read error amount | | 150MB/s | 157 |
| Second cache write hit amount | | 40MB/s | 158 |
| Second cache write error amount | | 10MB/s | |

160

COMPUTER AND MEMORY CONTROL METHOD

TECHNICAL FIELD

The present invention generally relates to control of a memory.

BACKGROUND ART

In a computer that includes a dynamic random access memory (DRAM) as a memory and includes a hard disk drive (HDD) as a storage device, an input/output (I/O) speed of the HDD is lower than an I/O speed of the DRAM. Therefore, cache technology for storing partial data in the HDD in a cache area of the DRAM and reading data from the cache area, not the HDD, when data of a read target exists in the cache area of the DRAM, has been known (refer to PTL 1). Thereby, when a cache is hit, the data can be read at a high speed, as compared with when the data is read from the HDD.

In addition, the DRAM has a work area in which data such as an application program is stored, in addition to the cache area. Because a storage area of the DRAM is limited, technology for providing a swap area becoming a saving destination of the data in the work area in the HDD in preparation for the case in which the work area is insufficient has been known.

CITATION LIST

Patent Literature

PTL 1: U.S. Pat. No. 5,420,998

SUMMARY OF INVENTION

Technical Problem

Generally, in the memory, the work area is secured more preferentially than the cache area. The I/O speed of the HDD provided with the swap area is slower than the I/O speed of the DRAM, as described above. For this reason, if a swap occurs, it is necessary to load the application program from the HDD to the work area, which may result in leading to degradation of performance of a computer. Therefore, it is thought that it is appropriate to minimize occurrence of the swap in suppressing the entire performance of the computer from being degraded.

However, the I/O speed of a semiconductor storage device such as a solid state drive (SSD) is higher than the I/O speed of the HDD. Therefore, when the swap area is provided on the semiconductor storage device such as the SSD, an idea of minimizing the occurrence of the swap may not be necessarily appropriate in suppressing the entire performance of the computer from being degraded.

Therefore, an object of the present invention is to appropriately adjust a size of a work area and a size of a cache area on a memory to suppress entire performance of a computer from being degraded.

Solution to Problem

A computer according to an embodiment includes: a first memory; a second memory that has an I/O speed lower than an I/O speed of the first memory; and a processor that is coupled to the first memory, the second memory, and a storage device. The first memory has a work area and a first cache area where data input to and output from the storage device is temporarily stored. The second memory has a second cache area where the data input to and output from the storage device is temporarily stored and a swap area to be a saving destination of data stored in the work area. When an input/output amount to be an amount of data input to and output from the storage device is larger than a predetermined input/output amount, the processor is configured to execute a first cache area expansion process for reducing the work area and expanding the first cache area.

Advantageous Effects of Invention

According to the present invention, a size of a work area and a size of a cache area on a memory can be appropriately adjusted and entire performance of a computer can be suppressed from being degraded.

BRIEF DESCRIPTION OF DRAWINGS

FIG. 4 illustrates an example of policy information according to the first embodiment.

FIG. 5 illustrates an example of operation information according to the first embodiment.

FIG. 11 illustrates an example of operation information according to the second embodiment.

DESCRIPTION OF EMBODIMENTS

Hereinafter, some embodiments will be described with reference to the drawings. A part or all of processes executed by a processor hereinafter may be executed by a hardware circuit. A computer program may be installed from a program source. The program source may be a program distribution server or storage media (for example, portable storage media).

First Embodiment

A first embodiment illustrates a method of adjusting a work area and a cache area on a memory and a swap area and a cache area on a storage device for a swap, in a computer.

Figure 1:
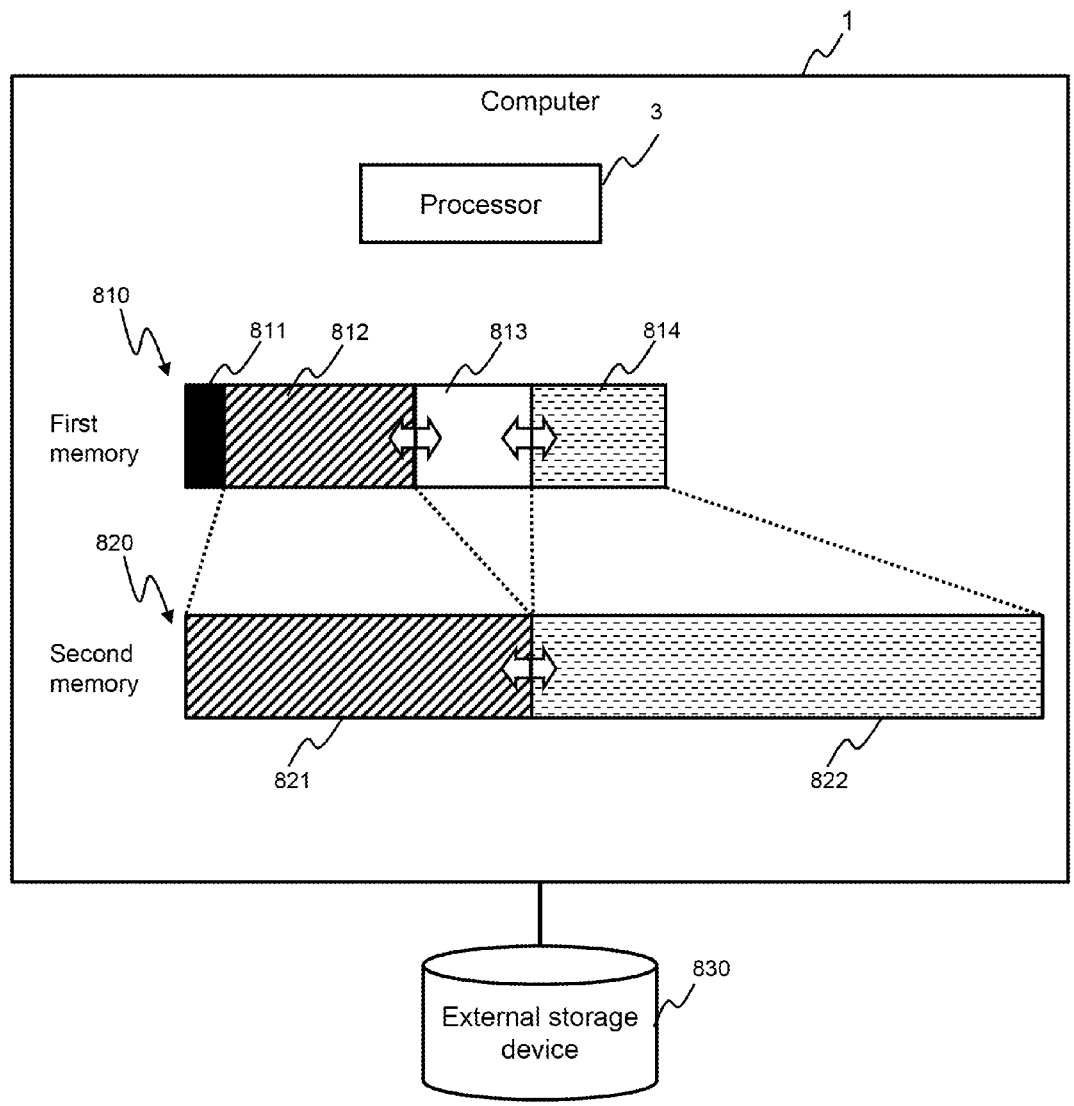
FIG. 1 is a schematic diagram illustrating an operation outline of a computer according to a first embodiment.

FIG. 1 is a schematic diagram illustrating an operation outline of a computer 1 according to the first embodiment.

The computer 1 has a processor 3, a first memory 810, and a second memory 820. The first memory 810 is a main memory composed of a DRAM, for example. The second memory 820 is a storage device composed of an SSD, for example. That is, an I/O speed of the first memory 810 is higher than an I/O speed of the second memory 820.

A storage area of the first memory 810 has a predetermined size, for example, and includes a system area 811, a work area 812, a first cache area 814, and an empty area 813. The system area 811 is an area in which a program regarding an operating system (OS) is stored. The work area 812 is an area in which an execution program (for example, an application program) executed on the OS and data used by at least one of the OS and the execution program is temporarily stored. In the following description, the data stored in the work area 812 may be generally called "data", even though the data is program or data used for the program. The first cache area 814 is an area in which data input to and output from an external storage device 830 is temporarily stored. The empty area 813 is an area other than the system area 811, the work area 812, and the first cache area 814 in a first storage area. The processor 3 can change sizes of at least the work area 812 and the first cache area 814 of the first memory 810.

A storage area of the second memory 820 has a predetermined size, for example, and includes a swap area 821 and a second cache area 822. The swap area 821 is an area for swapping data in the work area 812 (that is, an area of a saving destination of the data in the work area 812). The second cache area 822 is an area where data input to and output from the external storage device 830 is temporarily stored. The data stored in the second cache area 822 is not stored in the first cache area 814 and the data stored in the first cache area 814 is not stored in the second cache area 822. However, the same data may be stored in both the first cache area 814 and the second cache area 822. The processor 3 can change sizes of the swap area 821 and the second cache area 822.

In the work area 812 and the swap area 821, data regarding the execution program executed by the processor 3 is stored. The execution program is an application program executed by a user, for example.

Generally, if the work area 812 shows an insufficiency tendency, the processor 3 expands the work area 812. However, when the work area 812 is still insufficient, the processor 3 saves partial data (for example, the execution program) in the work area 812 to the swap area 821 and eliminates the insufficiency of the work area 812.

Meanwhile, the processor 3 stores the partial data stored in the external storage device 830 as cache data in the first cache area 814 or the second cache area 822 to decrease an I/O amount for the external storage device 830. If the cache data in the first cache area 814 or the second cache area 822 is hit when data is read from the external storage device 830, the processor 3 reads the cache data. Thereby, the I/O amount for the external storage device 830 is decreased. That is, at least one of the first cache area 814 and the second cache area 822 is expanded, so that a cache hit ratio increases and the I/O amount for the external storage device 830 is decreased.

Generally, because a swap area is provided in the external storage device 830 (for example, an HDD) having an I/O speed lower than an I/O speed of the first memory 810 (for example, a DRAM), it is appropriate to maximize a size of the work area 812 and minimize use of the swap area of the external storage device 830. However, in this embodiment, as illustrated in FIG. 1, the swap area 821 is provided in the second memory 820 (for example, an SSD) having the I/O speed lower than the I/O speed of the first memory 810 and the I/O speed higher than the I/O speed of the external storage device 830. In this case, an idea of maximizing the size of the work area 812 may not be necessarily appropriate. For example, when the I/O amount for the external storage device 830 is large, the cache hit ratio is increased by increasing the size of the first cache area 814 of the first memory 810. Thereby, the I/O amount for the external storage device 830 can be decreased. If the size of the first cache area 814 of the first memory 810 increases, the size of the work area 812 decreases and the possibility of the swap occurring in the swap area 821 becomes high. However, as described above, because the I/O speed of the second memory 820 is relatively high, this may not necessarily lead to degradation of performance.

Hereinafter, a method of suppressing the performance of the computer 1 from being degraded by appropriately changing the sizes of the work area 812 and the first cache area 814 of the first memory 810 and the sizes of the swap area 821 and the second cache area 822 of the second memory 820 by the processor 3 according to a situation will be described in detail.

Figure 2:
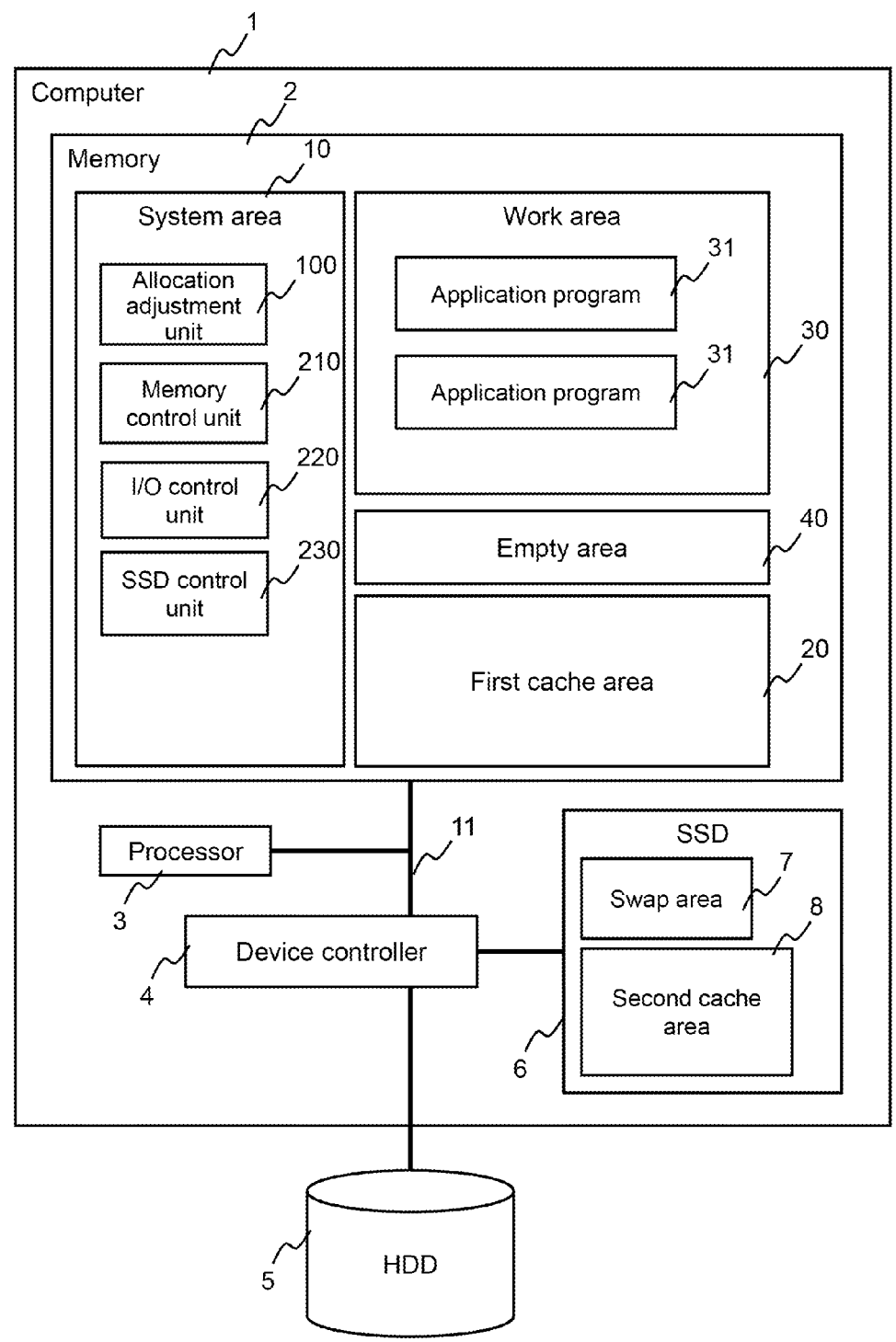
FIG. 2 is a block diagram illustrating a configuration example of the computer according to the first embodiment.

FIG. 2 is a block diagram illustrating a configuration example of the computer 1 according to the first embodiment.

The computer 1 includes a memory 2, a processor 3, a device controller 4, and an SSD 6 and an HDD 5 coupled to the device controller 4 as hardware. The SSD 6 and the HDD 5 may be included in an inner portion or an external portion of the computer 1.

The processor 3 executes various operations according to an operation circuit or a computer program, controls the other elements 2, 4, 5, and 6, and realizes various functions of the computer 1.

The memory 2, the processor 3, and the device controller 4 are coupled by an internal bus 11 that can transmit data bi-directionally. The internal bus 11 includes a memory bus and a PCI-Express bus, for example.

The HDD 5 to be an example of the external storage device reads and writes data, according to an I/O request from the processor 3. The HDD 5 may be other non-volatile storage device, such as the SSD 6, for example.

The SSD 6 to be an example of the second memory is used as a swap area and a cache area of data. For example, the SSD 6 may be other non-volatile storage device such as a phase change RAM (PRAM), a magnetoresistive random access memory (MRAM), a resistance random access memory (ReRAM), or a ferroelectric random access memory (FeRAM).

The device controller 4 controls the SSD 6 and the HDD 5 coupled to the device controller 4. The device controller 4 has a control function based on a coupling method such as serial ATA (SATA), SCSI, iSCSI, or Fibre channel (FC), for example.

The HDD 5 and the SSD 6 may be coupled to different device controllers 4, respectively. For example, the device controller 4 may be configured as a PCI-Express interface and the SSD 6 may be configured as a flash memory chip. The HDD 5 and the SSD 6 may be shared by a plurality of computers 1.

The memory 2 to be an example of the first memory stores a computer program and data used by the processor 3. For example, the memory 2 is configured from a DDR3-DRAM, a MRAM, or a FeRAM. A storage area in the memory 2 may be configured by a plurality of pages having predetermined sizes.

The memory 2 has a system area 10, a work area 30, a cache area 20, and an empty area 40. A program regarding an OS is held in the system area 10. The OS has an allocation adjustment unit 100, a memory control unit 210, an SSD control unit 230, and an I/O control unit 220 (or the allocation adjustment unit 100, the memory control unit 210, the SSD control unit 230, and the I/O control unit 220 are realized by functions provided by the OS and computer programs executed on the OS). These functions will be described in detail below.

In the first cache area 20, partial data input to and output from the HDD 5 is stored as cache data. In the work area 30, an application program 31 or the like is stored. The empty area 40 is an area that is not yet used.

The I/O control unit 220 controls I/O for the HDD 5. The I/O control unit 220 issues an I/O request to the HDD 5, on the basis of the I/O request issued from the application program 31. The I/O control unit 220 may store read data and write data for the HDD 5 in the first cache area 20 or the second cache area 8. In addition, when read requested data exists in the first cache area 20 or the second cache area 8 (that is, when a cache is hit), the I/O control unit 220 may read data from the cache areas 20 and 8. Thereby, an I/O amount for the HDD 5 is decreased.

The I/O control unit 220 may measure the I/O amount for the HDD 5. The I/O amount is an issue number of the I/O request or a transmission data amount per unit time, for example. The I/O control unit 220 may provide the measured I/O amount to the allocation adjustment unit 100. The I/O control unit 220 may adjust an I/O amount per unit time not to be more than an upper limit designated from the allocation adjustment unit 100.

The memory control unit 210 controls the memory 2. The memory control unit 210 performs write, read, and erasure of data for the storage area of the memory 2. The memory control unit 210 swaps the data stored in the work area 30 and the data stored in the swap area 7. The memory control unit 210 changes the sizes of the work area 30 and the first cache area 20 in the storage area of the memory 2, on the basis of an indication from the allocation adjustment unit 100. That is, the memory control unit 210 changes the number of pages allocated to the work area 30 and the first cache area 20.

The SSD control unit 230 controls the SSD 6. The SSD control unit 230 performs write, read, and erasure of data for the storage area of the SSD 6. The SSD control unit 230 secures the swap area 7 and the second cache area 8 in the storage area of the SSD 6 or changes the sizes of the swap area 7 and the second cache area 8 in the storage area of the SSD 6, on the basis of an indication from the allocation adjustment unit 100. The SSD control unit 230 may be one type of a device driver of the SSD 6 and may be a predetermined program between the I/O control unit 220 and the device driver of the SSD 6.

For example, when the OS is Linux (registered trademark), the SSD control unit 130 may execute an lvresize command or an lvcreate command using a logical volume manager (LVM) and secure or change the swap area 7 and the second cache area 8. For example, the SSD control unit 130 may execute a fdisk command using GNU Parted and secure or change the swap area 7 and the second cache area 8. For example, the SSD control unit 130 may execute a swappon command and a swappoff command and change validation and invalidation of a page regarding the swap area 7.

The allocation adjustment unit 100 adjusts the work area 30 and the first cache area 20 in the second area of the memory 2 and the swap area 7 and the second cache area 8 in the storage area of the SSD 6. Hereinafter, the allocation adjustment unit 100 will be described in details.

Figure 3:
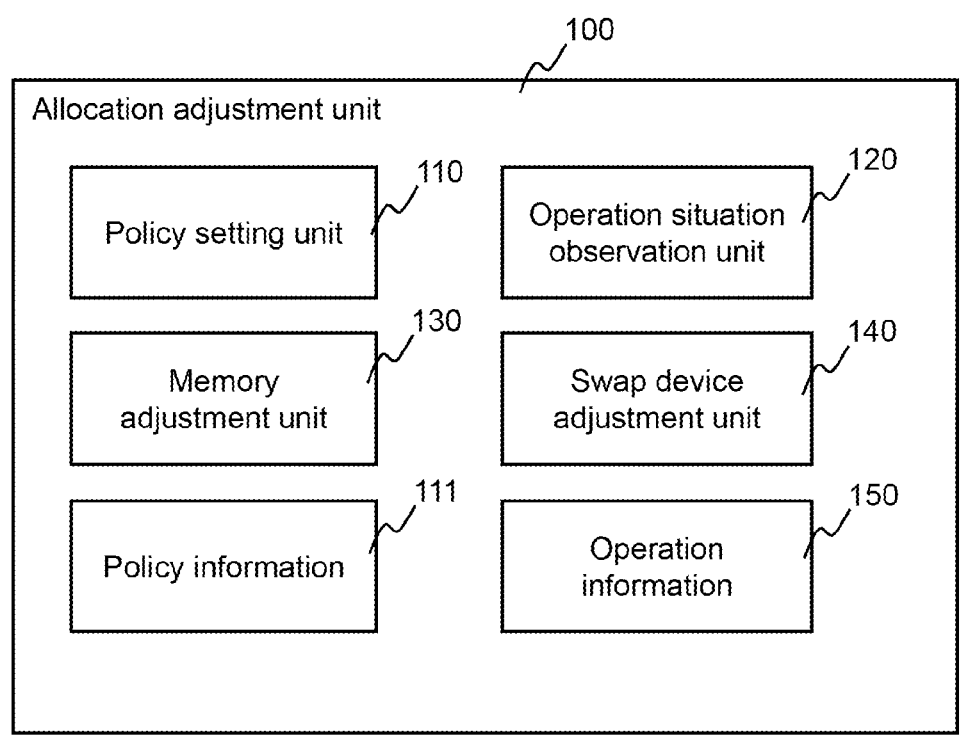
FIG. 3 is a block diagram illustrating a configuration example of an allocation adjustment unit according to the first embodiment.

FIG. 3 is a block diagram illustrating a configuration example of the allocation adjustment unit 100. The allocation adjustment unit 100 has a policy setting unit 110, an operation situation observation unit 120, a memory adjustment unit 130, a swap device adjustment unit 140, policy information 111, and operation information 150.

FIG. 4 illustrates an example of the policy information 111. The policy information 111 has information that becomes a reference when the work area 30 and the first cache area 20 and the swap area 7 and the second cache area 8 are changed. For example, the policy information 111 may be set by a user of the computer 1 or may be acquired from an external server through a communication network.

The policy information 111 has an I/O reference amount 112 of the HDD, a swap frequency reference amount 113, a swap securement reference value 114, a swap use upper limit 115, and a swap use lower limit 116 as attributes.

The I/O reference amount 112 of the HDD is used to determine whether the I/O amount of the HDD 5 is excessively large or not. For example, the I/O reference amount 112 of the HDD is represented by a data amount per second.

The swap frequency reference amount 113 is used to determine whether the occurrence frequency of the swap is excessively large or not. For example, the swap frequency reference amount 113 is represented by the number of times of occurrence of the swap per second.

The swap securement reference value 114 is used for a reference of a non-used area to be secured in the swap area 7. For example, the swap securement reference value 114 is represented by a ratio of a use area for the swap area 7.

The swap use upper limit 115 is used to determine whether the swap area 7 is expanded or not. For example, the swap use upper limit 115 is represented by a ratio of a use area for the swap area 7.

The swap use lower limit 116 is used to determine whether the swap area 7 is reduced or not. For example, the swap use lower limit 116 is represented by a ratio of a use area for the swap area 7.

The policy setting unit 110 acquires the policy information 111. For example, the policy setting unit 110 acquires the policy information 111 input by the user of the computer 1 or acquires the policy information 111 from the external apparatus through the communication network. The policy setting unit 110 may deliver the I/O reference amount 112 of the HDD 5 included in the policy information 111 to the I/O control unit 220. The I/O control unit 220 may adjust the I/O amount of the HDD 5 not to be more than the I/O reference amount 112 of the HDD 5.

FIG. 5 illustrates an example of the operation information 150. The operation information 150 has information regarding an operation situation of the computer 1. The operation information 150 is used to determine whether the sizes of the work area 30 and the first cache area 20 in the storage area of the memory 2 and the sizes of the swap area 7 and the second cache area 8 in the storage area of the SSD 6 are changed or not and is used to calculate amounts of the sizes to be changed.

The operation information 150 has a work area amount 151, a swap area amount 152, a swap use amount 153, a swap frequency 154, a second cache read hit amount 155, a second cache read error amount 156, a second cache write hit amount 157, and a second cache write error amount 158 as attributes.

The work area amount 151 shows a size of the work area 30 at a certain time point. The swap area amount 152 shows a size of the swap area 7 at a certain time point. The swap use amount 153 shows a use amount of the swap area amount 157 at a certain time point.

The swap frequency 154 shows the frequency of the swap occurring per unit time. For example, the swap frequency 154 is represented by the number of times of occurrence of the swap per second.

The second cache read hit amount 155 shows an amount of data in which the cache data of the second cache area 8 is hit for a read request per unit time (for example, for one second).

The second cache read error amount 156 shows an amount in which the cache data of the second cache area 8 is not hit (is missed) for the read request per unit time. That is, the second cache read error amount shows an amount of data read from the HDD 5.

The second cache write hit amount 157 shows an amount in which the cache data of the second cache area 8 is hit for a write request per unit time.

The second cache write error amount 158 shows an amount in which the cache data of the second cache area 8 is not hit (is missed) for the write request per unit time. That is, the second cache write error amount 158 shows an amount of data written to the HDD 5.

For example, the work area amount 151, the swap area amount 152, the swap use amount 153, and the swap frequency 154 may be measured by the memory control unit 210. For example, the hit amounts 155 and 157 and the error amounts 156 and 158 of the second cache may be measured by the SSD control unit 6 and the I/O control unit 220.

The first cache area 20 and the second cache area 8 may be used as one cache memory area not to be divisionally used or may be divisionally used by the processor 3. As an example of the division use, cache data having a relatively high cache hit ratio may be stored in the first cache area 20, cache data having a relatively low cache hit ratio may be stored in the second cache area 8, read data may be stored in the first cache area 20, and write data may be stored in the second cache area 8. Cache data read-hit in the second cache area 8 (or cache data having a read hit ratio larger than a threshold value among the cache data in the second cache area 8) may be migrated from the second cache area 8 to the first cache area 20. At this time, data having a lowest hit ratio in the first cache area 20 may be migrated to the second cache area 8.

The I/O amount of the HDD 5 per unit time may be different according to a write mode in the computer 1. As the write mode, a write-back mode and a write-through mode are exemplified. In the "write-back mode", the I/O control unit 220 returns write completion to the application program 31 when write data according to a write request from the application program 31 has been written to the second cache area 8 or the first cache area 20 and then writes the write data (cache data) to the HDD 5.

Meanwhile, in the "write-through mode", the I/O control unit 220 returns write completion to the application program 31 when the write data according to the write request from the application program 31 has been written to the second cache area 8 or the first cache area 20 (or the write data has not written to both the cache areas 8 and 20) and the write data has been written to the HDD 5.

When the write mode is the "write-through mode", "I/O amount of HDD=second cache read error amount+second cache write hit amount+second cache write error amount" is calculated.

When the write mode is the "write-back mode", "I/O amount of HDD=second cache read error amount+second cache write error amount" is calculated. This is because the same write data cache-hit may be then written asynchronously to the HDD 5 once, in the case of the "write-back mode".

The operation situation observation unit 120 observes information 151 to 158 associated with the operation information 150 and updates the operation information 150 on the basis of an observation result. The operation situation observation unit 120 may acquire the information 151 to 158 associated with the operation information 150 from the I/O control unit 220, the memory control unit 210, and the SSD control unit 230 at predetermined timing (for example, a constant cycle).

The memory adjustment unit 130 adjusts allocations of pages of the memory 2 to the work area 30 and the first cache area 20, by referring to the operation information 150. If the number of allocated pages is increased, an area is expanded and if the number of allocated pages is decreased, the area is reduced.

In the case of "swap frequency 154>swap frequency reference amount 113", the memory adjustment unit 130 may expand the work area 30. That is, the memory adjustment unit 130 makes the swap hard to occur. For example, when the OS is Linux, the memory adjustment unit 130 may change a "swappiness value" and adjust easiness of occurrence of the swap of the data of the work area 30. When the swappiness value decreases, the data in the work area 30 is hard to be swapped. In contrast, when the swappiness value increases, the data in the work area 30 is easy to be swapped. Therefore, the memory adjustment unit 130 may decrease the swappiness value to make the data in the work area 30 hard to be swapped and expand the work area 30.

In the case of "I/O amount of HDD>I/O reference amount 112 of HDD", the memory adjustment unit 130 may reduce the work area 30. That is, when a cache hit ratio is smaller than a predetermined reference value, the memory adjustment unit 130 may reduce the work area 30. If the memory adjustment unit 130 increases a swappiness value, the data in the work area 30 is easy to be swapped. As a result, the work area 30 is reduced. The memory control unit 210 allocates an area remaining after securing the work area 30 (area corresponding to a difference before and after the reduction of the work area 30) in the storage area of the memory 2 as one area of the first cache area 20. Therefore, if the work area 30 is reduced, the first cache area 20 is expanded according to the reduction. If the first cache area 20 is expanded, the cache hit ratio can be improved. Therefore, the I/O amount of the HDD can be decreased.

In actuality, a process for changing the work area 30 and the first cache area 20 may be executed by the memory control unit 210. That is, the memory adjustment unit 130 may change the swappiness value and the memory control unit 210 may actually change the work area 30 and the first cache area 20 on the memory, according to the changed swappiness value. The memory control unit 210 may change ratios of the work area 30 and the first cache area 20 for the storage area of the memory 2, according to the swappiness value.

The swap device adjustment unit 140 adjusts the swap area 7 and the second cache area 8 in the SSD 6, by referring to the operation information 150. The swap device adjustment unit 140 calculates "(work area amount 151+swap use amount 153)/(work area amount 151+swap area amount 152)×100(%)". A calculation value is called a "work & swap use ratio".

In the case of "work & swap use ratio>swap use upper limit 115", the swap device adjustment unit 140 expands the swap area 7 and reduces the second cache area 8. This is because the swap area 7 shows an insufficiency tendency.

In the case of "work & swap use ratio<swap use lower limit 116", the swap device adjustment unit 140 reduces the swap area 7 and expands the second cache area 8. This is because the cache hit ratio can be improved by allocating a non-used area of the swap area 7 to the second cache area 8.

In actuality, a process for changing the swap area 7 and the second cache area 8 may be executed by the SSD control unit 230. That is, the swap device adjustment unit 140 may determine the size of the swap area 7 and the SSD control unit 130 may actually change the swap area 7 and the second cache area 8 on the SSD 6, according to the determined size of the swap area 7.

A change amount of the size of the work area 30 and a change amount of the size of the first cache area 20 may be different from each other. In addition, expansion or reduction of the work area 30 and reduction or expansion of the first cache area 20 may not be necessarily linked. For example, when the size of the empty area 40 is sufficiently large, the work area 30 and the first cache area 20 may be expanded together and the empty area 40 may be reduced.

Likewise, a change amount of the size of the swap area 7 and a change amount of the size of the second cache area 20 may be different from each other. In addition, expansion or reduction of the size of the swap area 7 and reduction or expansion of the second cache area 8 may not be necessarily linked.

Figure 6:
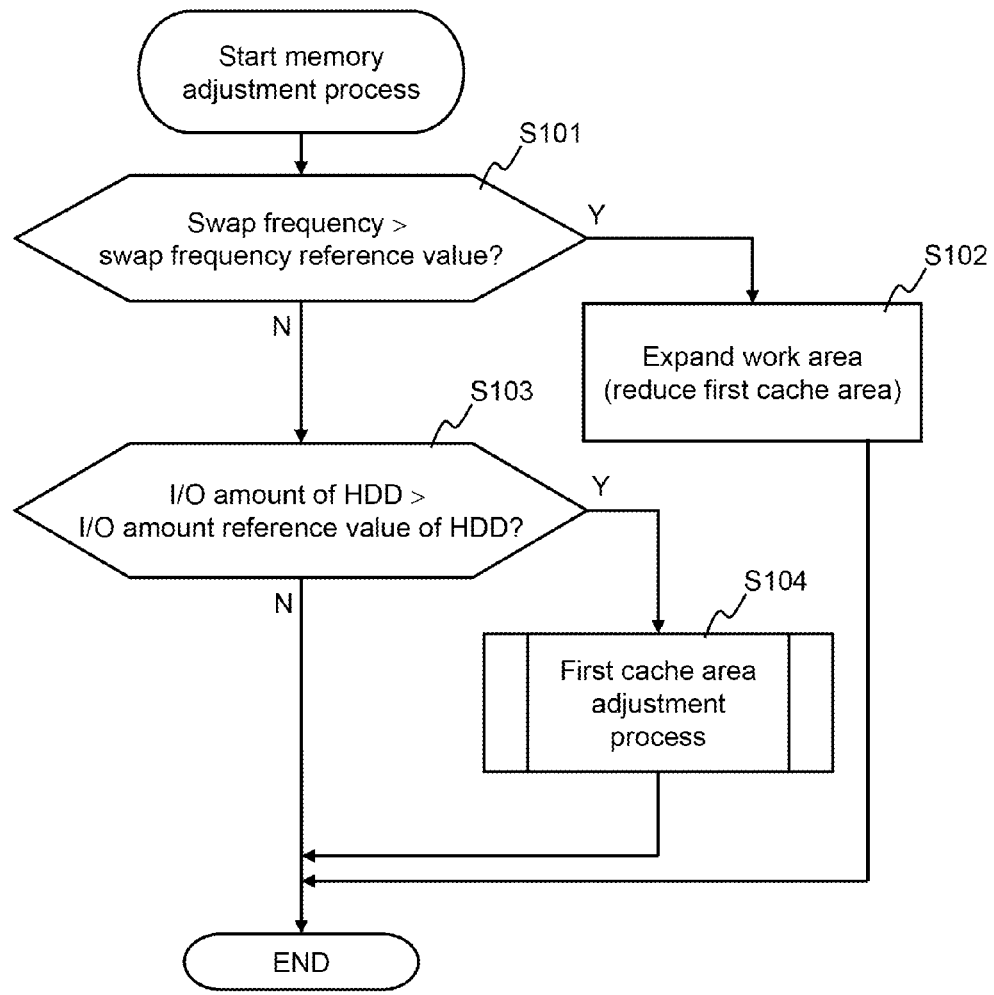
FIG. 6 is a flowchart illustrating an example of a memory adjustment process according to the first embodiment.

FIG. 6 is a flowchart illustrating an example of a memory adjustment process. The process is executed at a constant cycle, for example.

The memory adjustment unit 130 acquires the operation information 150 and determines whether "swap frequency>swap frequency reference value" is satisfied or not (S101).

In the case of swap frequency>swap frequency reference value" (S101: YES), the memory adjustment unit 130 indicates the memory control unit 210 to expand the work area 30 (decreases the swappiness value) (S102) and ends the process (END).

In the case of swap frequency≤swap frequency reference value" (S101: NO), the memory adjustment unit 130 determines whether "I/O amount of HDD>I/O reference amount of HDD" is satisfied or not (S103).

In the case of "I/O amount of HDD>I/O reference amount of HDD" (S103: YES), the memory adjustment unit 130 executes a first cache area adjustment process (S104) and ends the process (END). The first cache area adjustment process will be described in detail below.

In the case of "I/O amount of HDD≤I/O reference amount of HDD" (S103 NO), the memory adjustment unit 130 ends the process (END).

By the process described above, when the swap occurrence frequency is larger than the predetermined reference value, the work area 20 of the memory 2 is expanded. Thereby, the swap occurrence frequency decreases.

Figure 7:
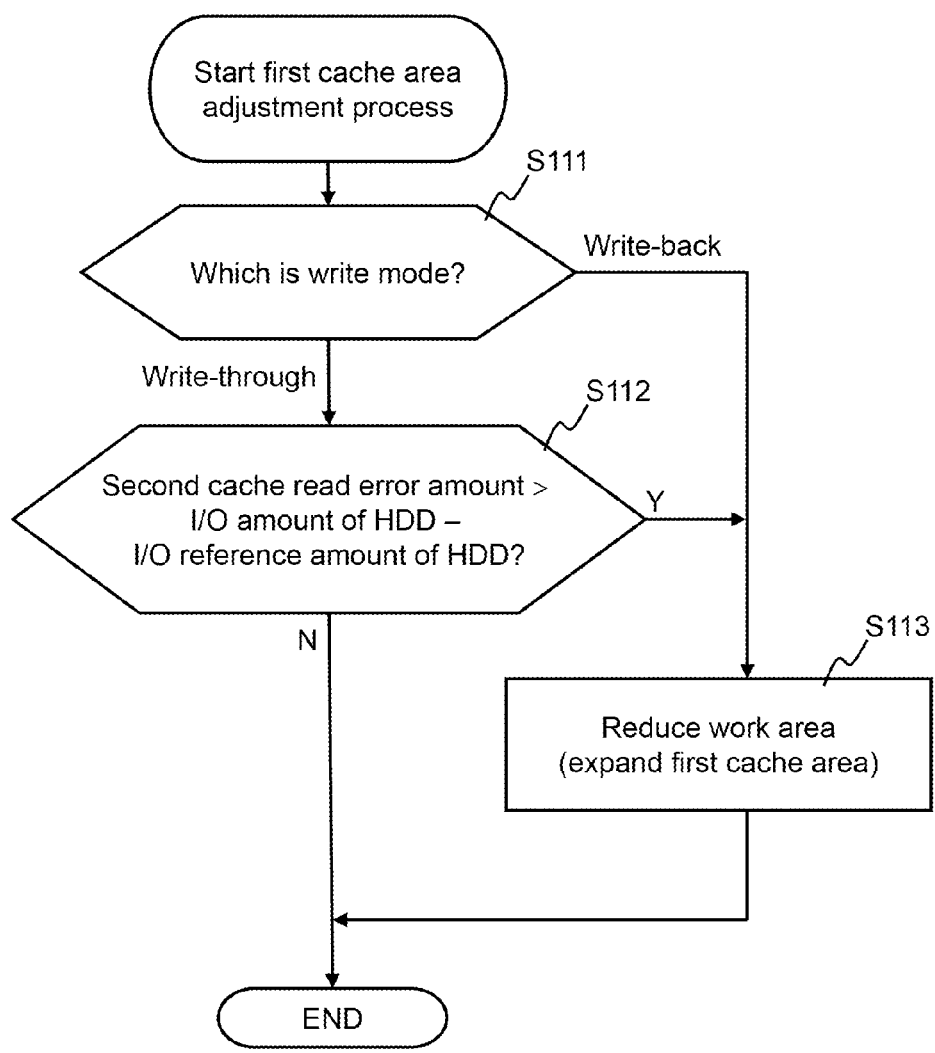
FIG. 7 is a flowchart illustrating an example of a first cache area adjustment process according to the first embodiment.

FIG. 7 is a flowchart illustrating an example of the first cache area adjustment process. The process corresponds to S104 of FIG. 5.

The memory adjustment unit 130 determines whether the write mode is the "write-back mode" or the "write-through mode" (S111).

When the write mode is the "write-back mode" (S111: write-back), the memory adjustment unit 130 indicates the memory control unit 210 to reduce the work area 30 (increases the swappiness value) (S113) and ends the process (END).

When the write mode is the "write-through mode" (S111: write-through), the memory adjustment unit 130 determines whether "second cache read error amount>(I/O amount of HDD–I/O reference amount of HDD)" is satisfied or not, by referring to the operation information 150 (S112).

In the case of "second cache read error amount>(I/O amount of HDD–I/O reference amount of HDD)" (S112: YES), the memory adjustment unit 130 indicates the memory control unit 210 to reduce the work area 30 (increases the swappiness value) (S113) and ends the process (END).

In the case of "second cache read error amount≤(I/O amount of HDD–I/O reference amount of HDD)" (S112: NO), the memory adjustment unit 130 ends the process (END).

By the process described above, when the I/O amount of the HDD is larger than the predetermined reference amount, the first cache area 20 of the memory 2 is expanded. Thereby, the cache hit ratio is improved and the I/O amount of the HDD can be decreased.

Figure 8:
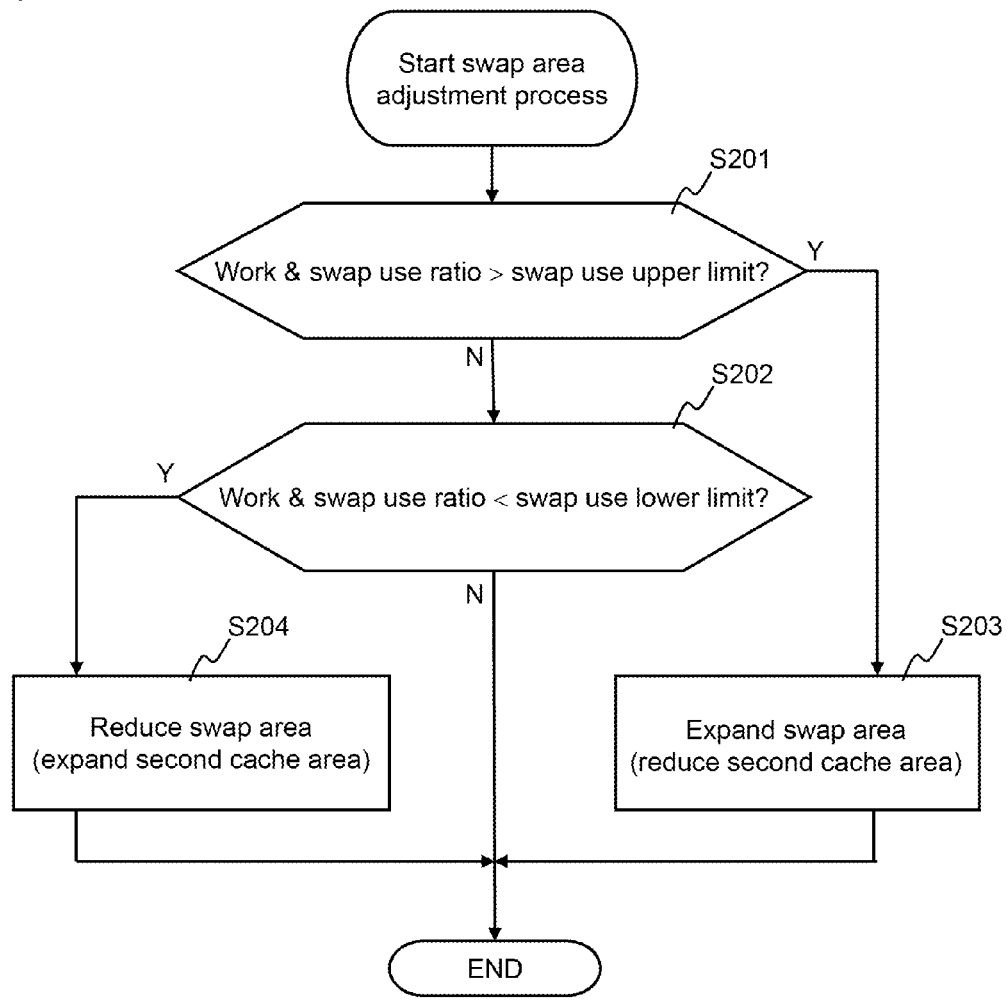
FIG. 8 is a flowchart illustrating an example of a swap area adjustment process according to the first embodiment.

FIG. 8 is a flowchart illustrating an example of a swap area adjustment process. The process is executed at a constant cycle, for example.

The swap device adjustment unit 140 determines whether "work & swap use ratio>swap use upper limit" is satisfied or not, by referring to the operation information 150 (S201).

In the case of "work & swap use ratio>swap use upper limit" (S201: YES), the swap device adjustment unit 140 executes a process for expanding the swap area 7 of the SSD 6 and reducing the second cache area 8 (S203) and ends the process (END).

In the case of "work & swap use ratio≤swap use upper limit" (S201: NO), the swap device adjustment unit 140 determines whether "work & swap use ratio<swap use lower limit" is satisfied or not (S202).

In the case of "work & swap use ratio<swap use lower limit" (S202: YES), the swap device adjustment unit 140 executes a process for reducing the swap area 7 of the SSD 6 and expanding the second cache area 8 (S204) and ends the process (END).

In the case of "work & swap use ratio≥swap use lower limit" (S202: NO), the swap device adjustment unit 140 ends the process (END).

By the process described above, when the swap area 7 shows an insufficiency tendency, the swap area 7 of the SSD 6 is expanded. Thereby, the swap area 7 can be avoided from being insufficient. When the swap area 7 shows an excess tendency, the swap area 7 of the SSD 6 is reduced. Thereby, the second cache area 8 is expanded and a cache hit ratio for the HDD 5 can be improved. That is, an I/O amount of the HDD can be decreased.

Second Embodiment

A second embodiment illustrates a method of adjusting a work area and a cache area on a memory and a swap area and a cache memory on a storage device for a swap, in a computer to execute a virtual machine. Hereinafter, elements identical to the elements in the first embodiment are denoted with the same reference numerals and explanation thereof is omitted.

Figure 9:
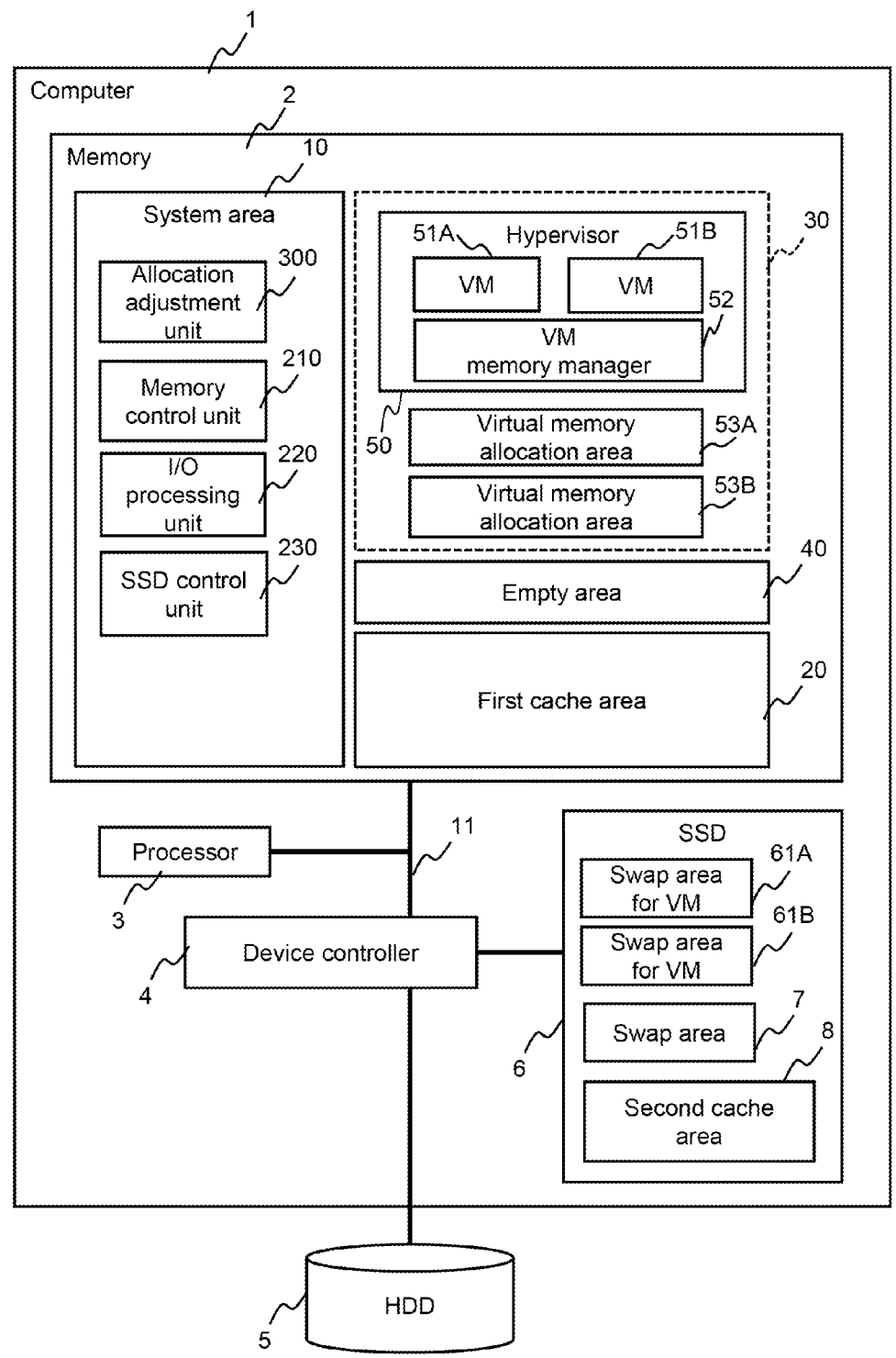
FIG. 9 is a block diagram illustrating a configuration example of a computer according to a second embodiment.

FIG. 9 is a block diagram illustrating a configuration example of a computer 1 according to the second embodiment. A hardware configuration of the computer 1 is identical to the hardware configuration of the computer 1 illustrated in FIG. 1.

A memory 2 has a system area 10, a work area 30, an empty area 40, and a first cache area 20. A processor 3 executes a hypervisor 50 in the work area 20. The hypervisor 50 is an application program that becomes a base to realize the virtual machine.

A plurality of virtual machines 51A and 51B are executed on the hypervisor 50 and an independent virtual OS is executed in each of the virtual machines 51A and 51B. The hypervisor 50 has a virtual machine memory manager 52.

The virtual machine memory manager 52 allocates pages of the physical memory 2 to virtual memories of the virtual machines 51A and 51B or collects the pages of the physical memory 2 allocated to the virtual memory. In the memory 2, an area allocated to the virtual memory of the virtual machine is called a "virtual memory allocation area". In FIG. 9, virtual memory allocation areas 53A and 53B are allocated to the virtual memories of the virtual machines 51A and 51B, respectively.

An SSD 6 has swap areas 61A and 61B for the virtual machines used from virtual OSs on the virtual machines, a swap area 7 used from an OS on the computer 1, and a second cache area 8. In FIG. 9, the swap areas 61A and 61B for the virtual machines are used from the virtual OSs of the virtual machines 51A and 51B, respectively. The second cache area 8 may not be secured for each virtual machine. This is because read and write requests issued from the virtual machines 51A and 51B are finally executed as the I/O of the computer 1.

The OS on the computer 1 saves data in the work area 30 to the swap area 7 of the SSD 6. However, data of the virtual memory allocation areas 53A and 53B is not preferably saved to the swap area 7. This is because, if the virtual memory allocation areas 53A and 53B allocated to the virtual memory are saved to the swap area 7 of the SSD 6 having an I/O speed lower than I/O speed of the memory 2, the virtual OSs on the virtual machines operating on the assumption that the I/O speed of the virtual memory is higher than the I/O speed of the swap area may execute an operation other than the assumption.

In order to avoid the above problem from occurring, a program called a balloon driver is executed on the virtual OS on the virtual machine. The balloon driver is used when the virtual machine memory manager 52 collects unnecessary pages of the virtual memory. For example, if the virtual machine memory manager 52 indicates the virtual OS on the virtual machine 51A to collect unnecessary pages, the balloon driver on the virtual machine 51A secures a large amount of pages of the virtual memory. In this case, the virtual OS on the virtual machine 51A saves data, which does not cause a problem even when the data is saved to the swap area in the virtual memory, to the swap area 61A for the virtual machine. Next, the virtual machine memory manager 52 collects the pages of the virtual memory allocation area 53A allocated to the pages of the virtual memory secured by the balloon driver. Thereby, the data of the virtual memory allocation area 53A can be avoided from being saved to the swap area 7 due to reduction of the virtual memory allocation area 53A.

Figure 10:
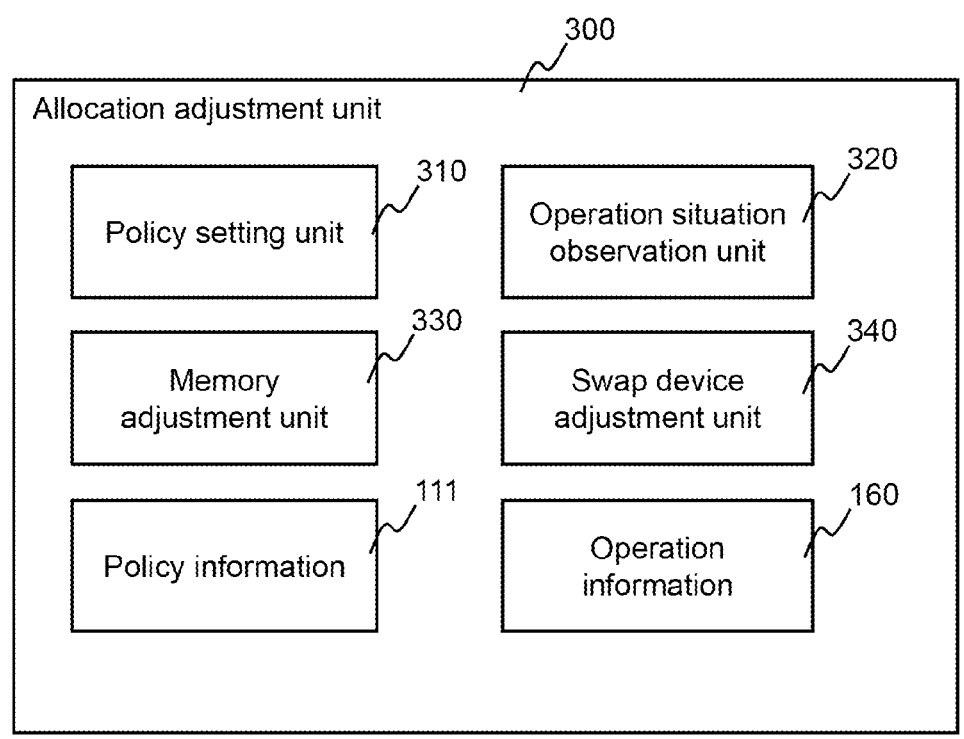
FIG. 10 is a block diagram illustrating a configuration example of an allocation adjustment unit according to the second embodiment.

FIG. 10 is a block diagram illustrating a configuration example of an allocation adjustment unit 300 according to the second embodiment. The allocation adjustment unit 300 has a policy setting unit 310, an operation situation observation unit 320, a memory adjustment unit 330, a swap device adjustment unit 340, policy information 111, and operation information 160. Here, a portion different from the portion of the first embodiment will be described.

FIG. 11 illustrates an example of the operation information 160 according to the second embodiment.

The operation information 160 has information regarding operation situations of the virtual machines 51A and 51B and an operation situation of the computer 1. The operation information 160 has a virtual memory use amount 161, a swap area amount 162, a swap use amount 163, and a swap frequency 164 as attributes, for each of the virtual machines. In addition, similar to FIG. 5, the operation information 160 has a second cache read hit amount 155, a second cache read error amount 156, a second cache write hit amount 157, and a second cache write error amount 158 as the attributes.

The virtual memory use amount 161, the swap area amount 162, the swap use amount 163, and the swap frequency 164 may be measured by the virtual OS on the virtual machine and the virtual machine memory manager 52.

The operation situation observation unit 320 observes information regarding the operation information 160 and updates the operation information 160 on the basis of an observation result. The operation situation observation unit 320 may acquire information regarding the operation information 160 of each virtual machine at predetermined timing (for example, a constant cycle), through the virtual machine memory manager 52.

The memory adjustment unit 330 adjusts allocations of pages of the memory 2 to the virtual machine allocation areas 53A and 53B and the first cache area 20, by referring to the operation information 160.

When "swap frequency 161>swap frequency reference value 113" is satisfied for each of the virtual machines 51A and 51B (that is, when the swap frequency of the virtual OS on each virtual machine is large), the memory adjustment unit 330 may expand the virtual memory allocation areas 53A and 53B allocated to the virtual memories of the virtual machines 51A and 51B. For example, the memory adjustment unit 330 indicates the balloon drivers on the virtual machines 51A and 51B to reduce the balloons, through the virtual machine memory manager 52. If the balloon drivers receive a reduction indication of the balloons, the balloon drivers open the secured pages of the virtual memories. Thereby, because an available virtual memory increases, the virtual OS on the virtual machine can decrease occurrence of the swap.

When "swap frequency 161≤swap frequency reference value 113" is satisfied for each of the virtual machines 51A and 51B (that is, when the swap frequency of the virtual OS on each virtual machine is small), the memory adjustment unit 330 may register the virtual machines 51A and 51B on reduction candidates of the virtual machine allocation areas 53A and 53B. In addition, when "I/O amount of HDD>I/O reference amount 112 of HDD" is satisfied, the memory adjustment unit 330 may indicate the balloon drivers on the virtual machines registered on the reduction candidates to expand the balloons, through the virtual machine memory manager 52. If the balloon drivers receive an expansion indication of the balloons, the balloon drivers newly secure the pages of the virtual memories. In addition, the memory adjustment unit 330 collects the virtual memory allocation areas 53A and 53B corresponding to the pages of the virtual memories secured by the balloon drivers. Thereby, the virtual memory allocation areas 53A and 53B are reduced and the first cache area 20 is expanded according to the reduction. If the first cache area 20 is expanded, a cache hit ratio can be improved. Therefore, the I/O amount of the HDD can be decreased.

In actuality, a process for changing the work area 30 and the first cache area 20 may be executed by the memory control unit 210, similar to the first embodiment.

The swap device adjustment unit 340 calculates "(virtual memory use amount 161+swap use amount 163)/(virtual memory use amount 161+swap area amount 162)×100(%)" for each of the virtual machines 51A and 51B. A calculation value is called a "virtual machine & swap use ratio".

When "virtual machine & swap use ratio>swap use upper limit 115" is satisfied for each of the virtual machines 51A and 51B, the swap device adjustment unit 340 registers the virtual machines 51A and 51B on swap expansion candidates. When "virtual machine & swap use ratio<swap use lower limit 116" is satisfied for each of the virtual machines 51A and 51B, the swap device adjustment unit 340 registers the virtual machines 51A and 51B on swap reduction candidates.

In addition, the swap device adjustment unit 340 calculates a change amount of the size of the second cache area 8 of the SSD 6, on the basis of a difference of a total amount (called a "total expansion amount") of the swap areas 61A and 61B for the virtual machines in the virtual machines 51A and 51B registered on the swap expansion candidates and a total amount (called a "total reduction amount") of the swap areas 61A and 61B for the virtual machines in the virtual machines 51A and 51B registered on the swap reduction candidates. For example, the swap device adjustment unit 340 calculates "total expansion amount−total reduction amount=change amount". When the change amount is positive, the swap device adjustment unit 340 decreases the size of the second cache area 8 and when the change amount is negative, the swap device adjustment unit 340 increases the size of the second cache area 8. The size of the expansion or the reduction of the second cache area may be determined on the basis of the change amount.

Figure 12:
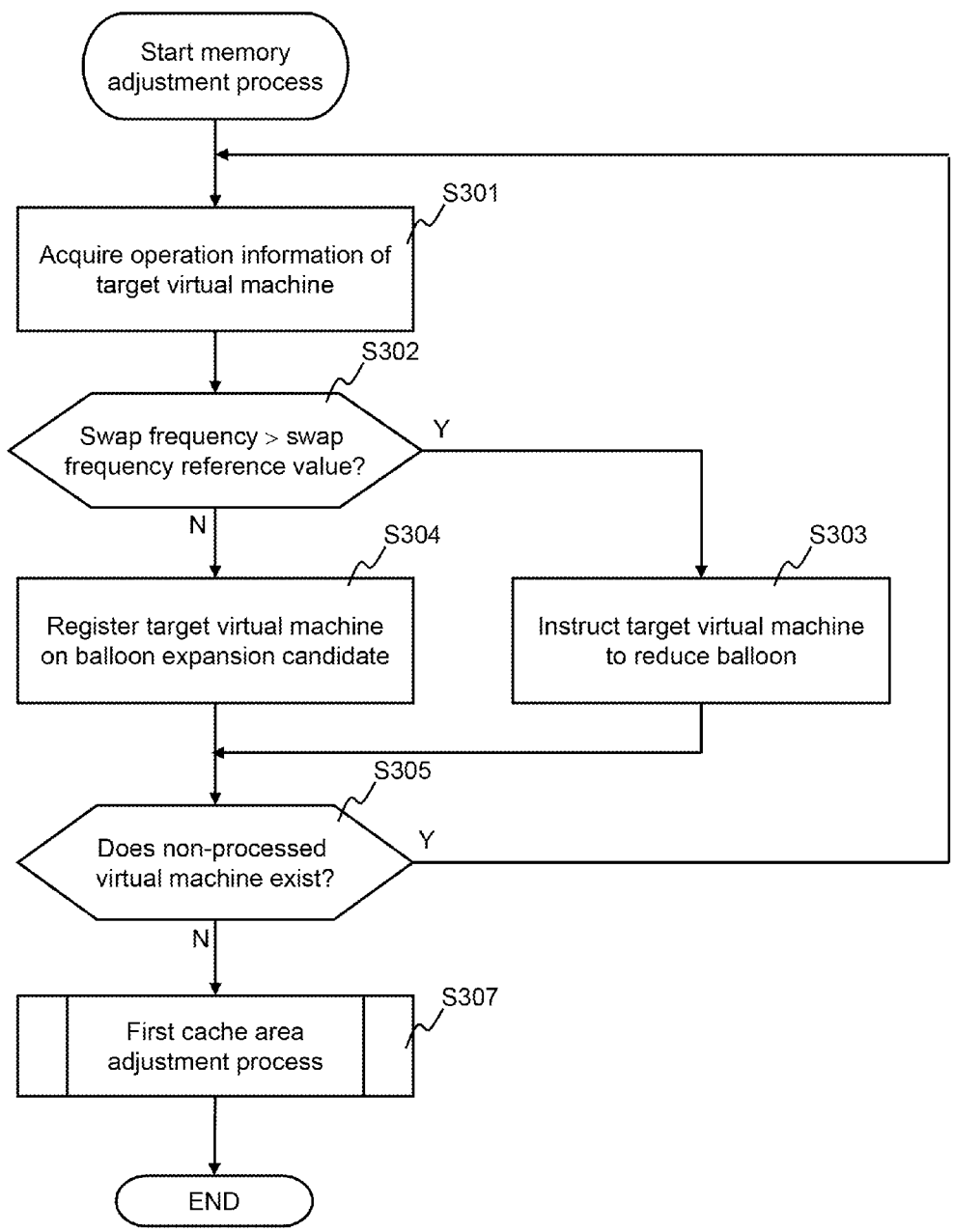
FIG. 12 is a flowchart illustrating an example of a memory adjustment process according to the second embodiment.

FIG. 12 is a flowchart illustrating an example of a memory adjustment process according to the second embodiment. The process is executed at a constant cycle, for example.

The memory adjustment unit 330 determines the virtual machine of a processing target (called a target virtual machine) from the non-processed virtual machines and acquires the operation information 160 regarding the target virtual machine (S301).

The memory adjustment unit 330 determines whether "swap frequency 164>swap frequency reference value 113" is satisfied or not in the target virtual machine (S302).

In the case of "swap frequency>swap frequency reference value" (S302: YES), the memory adjustment unit 330 indicates the balloon driver of the target virtual machine to reduce the balloon, through the virtual machine memory manager 52 (S303) and proceeds to S305.

In the case of "swap frequency≤swap frequency reference value" (S302: NO), the memory adjustment unit 330 registers the target virtual machine on the balloon expansion candidate (S304) and proceeds to S305.

In S305, the memory adjustment unit 330 determines whether the non-processed virtual machine exists or not (S305). When the non-processed virtual machine exists (S305: YES), the memory adjustment unit 130 returns to S301.

When the non-processed virtual machine does not exist (S305: NO), the memory adjustment unit 330 executes the first cache area adjustment process (S307) and ends the process (END). The first cache adjustment process will be described in detail below.

By the process described above, when the swap occurrence frequency in the virtual machine is larger than the predetermined reference value, the balloon driver on the virtual machine reduces the balloon and the available pages on the virtual memory increase. Thereby, the swap occurrence frequency in the virtual machine decreases.

Figure 13:
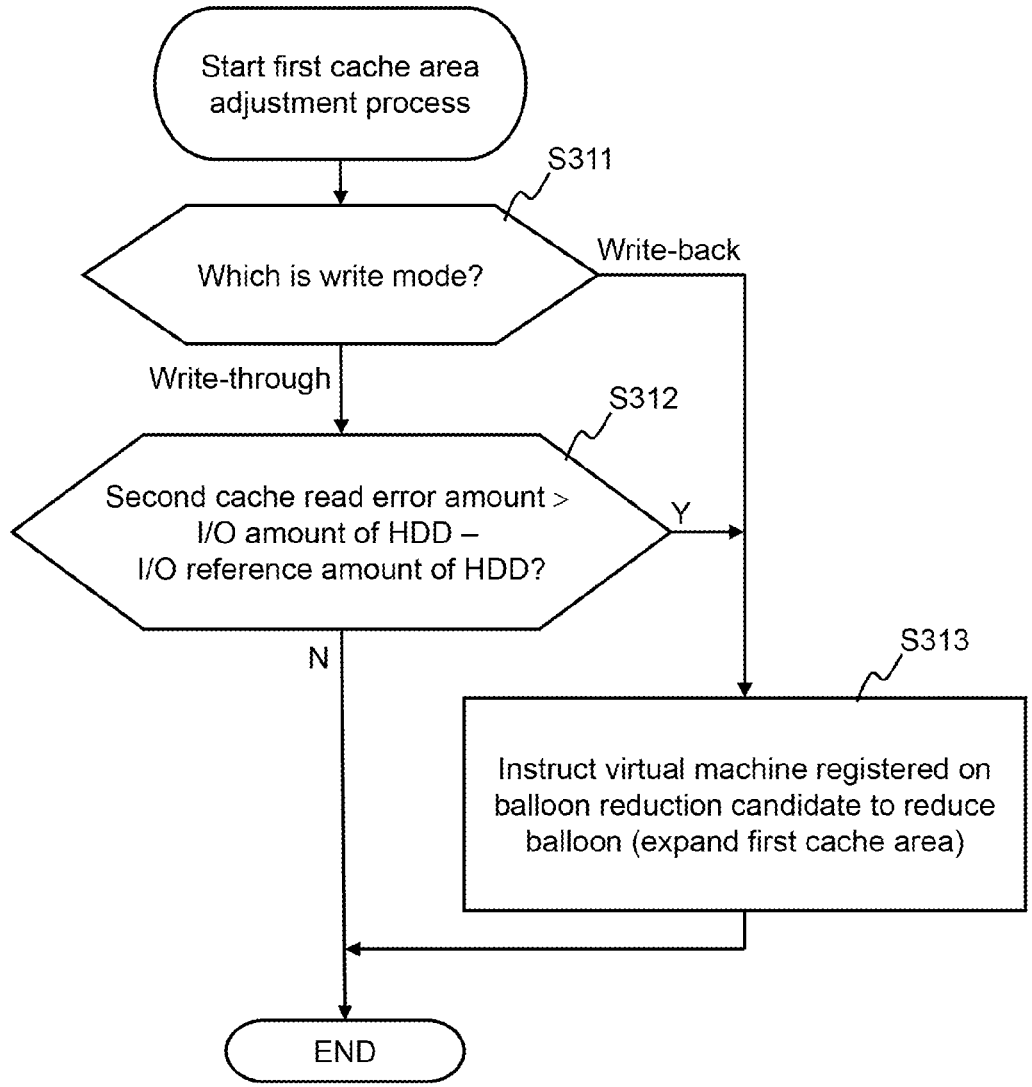
FIG. 13 is a flowchart illustrating an example of a first cache area adjustment process according to the second embodiment.

FIG. 13 is a flowchart illustrating an example of the first cache area adjustment process. The process corresponds to S307 of FIG. 10.

The memory adjustment unit 330 executes a process similar to the process of FIG. 6. However, the memory adjustment unit 330 executes the following process, instead of S113. That is, the memory adjustment unit 330 indicates the balloon driver of the virtual machine registered on the balloon reduction candidate to expand the balloon, through the virtual machine memory manager (S313) and ends the process (END).

By the process described above, when the I/O amount of the HDD is larger than the predetermined reference amount, the balloon driver on the virtual machine expands the balloon and the pages of the virtual memory allocation area can be collected. Therefore, the virtual memory allocation area is reduced and the first cache area 20 of the memory 2 is expanded according to the reduction. Thereby, the cache hit ratio is improved and the I/O amount of the HDD can be decreased.

Figure 14:
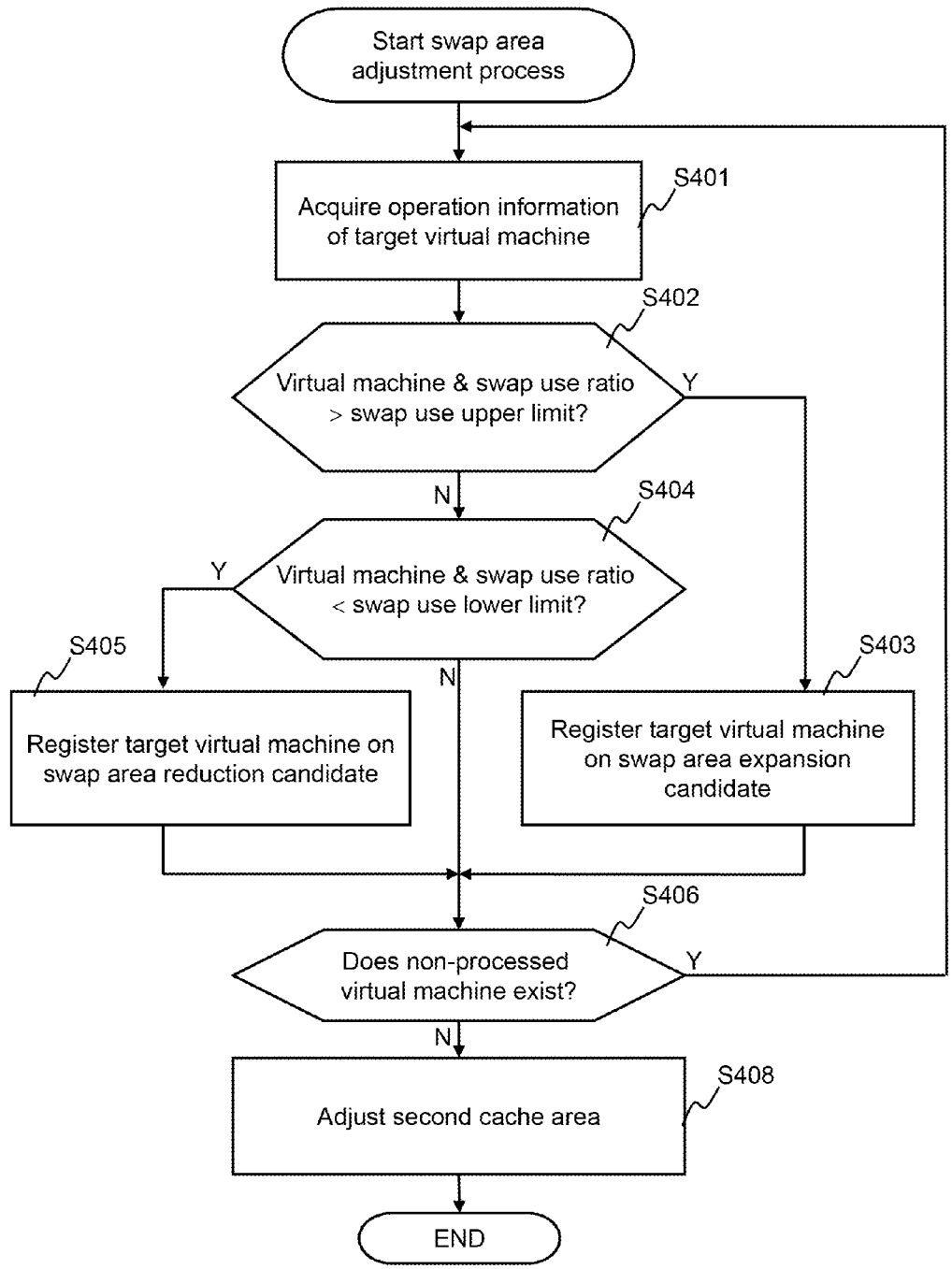
FIG. 14 is a flowchart illustrating an example of a swap area adjustment process according to the second embodiment.

FIG. 14 is a flowchart illustrating an example of a swap area adjustment process. The process is executed at a constant cycle, for example.

The swap device adjustment unit 340 determines the target virtual machine from the non-processed virtual machines and acquires the operation information 160 of the target virtual machine (S401).

The swap device adjustment unit 340 determines whether "virtual machine & swap use ratio>swap use upper limit 115" is satisfied or not for the target virtual machine (S402).

In the case of "virtual machine & swap use ratio>swap use upper limit 115" (S402: YES), the swap device adjustment unit 340 registers the virtual machine on the swap expansion candidate (S403) and proceeds to S406.

In the case of "virtual machine & swap use ratio≤swap use upper limit 115" (S402: NO), the swap device adjustment unit 340 determines whether "virtual machine & swap use ratio<swap use lower limit 116" is satisfied or not (S404).

In the case of "virtual machine & swap use ratio<swap use lower limit 116" (S404: YES), the swap device adjustment unit 340 registers the virtual machine on the swap reduction candidate (S405) and proceeds to S406.

In the case of "virtual machine & swap use ratio≥swap use lower limit 116" (S404: NO), the swap device adjustment unit 340 proceeds to S406.

In S406, the swap device adjustment unit 340 determines whether the non-processed virtual machine exists (S406). When the non-processed virtual machine exists (S406: YES), the swap device adjustment unit 340 returns to S401.

When the non-processed virtual machine does not exist (S406: NO), the swap device adjustment unit 340 calculates the change amount of the second cache area 6 of the SSD 6, on the basis of the sizes of the swap areas for the virtual machines in the virtual machines registered on the swap expansion candidate and the swap reduction candidate. In addition, the swap device adjustment unit 340 changes the size of the swap area for each virtual machine and changes the size of the second cache area 8 on the basis of the change amount (S408) and ends the process (END).

By the process described above, the swap area for the virtual machine showing the insufficiency tendency is expanded. Thereby, the swap area for the virtual machine can be avoided from being insufficient. In addition, the swap area for the virtual machine showing the excess tendency is reduced. Thereby, the second cache area 8 is expanded and the cache hit ratio for the HDD 5 can be improved. That is, the I/O amount of the HDD can be decreased.

Some embodiments described above are examples to describe the present invention and it is not intended that a range of the present invention is limited by only the embodiments. The present invention can be carried out according to a variety of other aspects by those skilled in art without departing from the scope of the present invention.

For example, the computer 1 described in the first and second embodiments may be applied to a storage controller in a storage apparatus (for example, a disk array apparatus) having a plurality of storage devices (for example, the HDD or the SSD) and a storage controller to control the I/O for the plurality of storage devices and may be applied to a host computer to issue an I/O request to a storage apparatus (external storage device).

In addition, for example, the storage device having the I/O speed lower than the I/O speed of the second memory (for example, the SSD) may not be necessarily the external storage device of the computer 1 and may be embedded in the computer 1.

REFERENCE SIGNS LIST

1: computer
2: memory
3: processor
4: device controller
5: HDD
6: SSD
7: swap area
8: second cache area
20: first cache area
30: work area
40: empty area
51A, 51B: virtual machine
52: virtual machine memory manager
53A, 53B: virtual memory allocation area
61A, 61B: swap area for virtual machine

The invention claimed is:

1. A computer comprising:
a first memory;
a second memory that has an I/O speed lower than an I/O speed of the first memory; and
a processor that is coupled to the first memory, the second memory, and a storage device, wherein
the first memory has a work area and a first cache area where data input to and output from the storage device is temporarily stored,
the second memory has a second cache area where the data input to and output from the storage device is temporarily stored and a swap area to be a saving destination of data stored in the work area, and
wherein the processor:
when an input/output amount to be an amount of data input to and output from the storage device is larger than a predetermined input/output amount, executes a first cache area expansion process for reducing the work area and expanding the first cache area,
when an occurrence frequency of saving data to the swap area is equal to or less than a predetermined occurrence frequency, executes the first cache area expansion process,
when a write-back mode is set, executes the first cache area expansion process, and
when the write-back mode is set and write data is written to the first cache area or the second cache area, determines that write is completed and then writes the write data from the first cache area or the second cache area to the storage device.

2. The computer according to claim 1, wherein
when a write-through mode is set and a cache read error amount is larger than a difference between the input/output amount and the predetermined input/output amount, the processor executes the first cache area expansion process,
when the write-through mode is set and write data is written to the storage device, the processor is configured to determine that write is completed, and
the cache read error amount is a total amount of read data not hit to both data stored in the first cache area and data stored in the second cache area.

3. The computer according to claim 1, wherein
when a ratio of a use amount for a total amount of the work area and the swap area is larger than a first ratio, the processor is configured to expand the swap area and reduce the second cache area,
when the ratio of the use amount is smaller than a second ratio, the processor is configured to reduce the swap area and expand the second cache area, and
the second ratio is smaller than the first ratio.

4. A computer system, the computer system comprising:
a processor communicatively coupled to a storage device;
a plurality of virtual machines that are executed by the processor,
a first memory commutatively coupled to the processor that includes a work area and a first cache area, wherein the first cache area temporarily stores data input to and output from the storage device and the work area includes a virtual memory allocation area allocated to a virtual memory of each of the plurality of virtual machines;
a second memory commutatively coupled to the processor, the second memory having an I/O speed lower than an I/O speed of the first memory, wherein the second memory includes a second cache area that temporarily stores the data input to an output from the storage device to a swap area allocated to each of the plurality of virtual machines;
wherein the processor:
when an input/output amount to be an amount of data input to and output from the storage device is larger than a predetermined input/output amount, executes a first cache area expansion process for reducing the work area and expanding the first cache area,
wherein the first cache area expansion process reduces a particular virtual memory allocation area allocated to a particular virtual machine of a reduction target among the plurality of virtual machines, reducing the work area in the first memory, and expanding the first cache area, and wherein the particular virtual machine is one of the plurality of virtual machines in which swap occurrence frequency for the swap area for the particular virtual machine is equal to or less than a predetermined swap occurrence frequency.

5. The computer according to claim 4, wherein the processor further:

sets a first virtual machine from the plurality of virtual machines in which a ratio of a use amount for a total amount of the virtual memory and the swap area for the virtual machine is larger than a third ratio, among the plurality of virtual machines, as a swap expansion candidate, sets a second virtual machine from the plurality of virtual machines in which the ratio of the use amount is smaller than a fourth ratio as a swap reduction candidate, and changes a size of the second cache area in the second memory, based on a difference of the swap area for the virtual machine allocated to each virtual machine corresponding to the swap expansion candidate and the swap area for the virtual machine allocated to each virtual machine corresponding to the swap reduction candidate.

6. A memory control method comprising:

executing a first cache area expansion process for reducing a work area of a first memory and expanding the first cache area of the first memory, when an amount of data input to or output from a storage device is larger than a predetermined input/output amount;

executing the first cache area expansion process, when an occurrence frequency of saving data to a swap area of a second memory is equal to or less than a predetermined occurrence frequency, wherein the second memory has an I/O speed lower than an I/O speed of the first memory;

executing the first cache area expansion process, when a write-back mode is set; and writing write data from the first cache area or a second cache area of the second memory to the storage device, when it is determined that a write operation where write data is written to the first cache area or the second cache area is completed and the write-back mode is set.

7. The method according to claim 6, further comprising:

executing the first cache area expansion process, when a write-through mode is set and a cache read error amount is larger than a difference between the input/output amount and the predetermined input/output amount; and writing the write data to the storage device, when the write-through mode is set; and wherein the cache read error amount is a total amount of read data not hit to both data stored in the first cache area and data stored in the second cache area.

8. The method according to claim 6, further comprising: wherein expanding the swap area and reducing the second cache area, when a ratio of a use amount for a total amount of the work area and the swap area is larger than a first ratio; and reducing the swap area and expanding the second cache area, when the ratio of the use amount is smaller than a second ratio, and the second ratio is smaller than the first ratio.

* * * * *